United States Patent
Gehlen et al.

[11] 3,777,503
[45] Dec. 11, 1973

[54] METHOD OF PRODUCING DEEP-FROZEN FILLET BLOCKS

[75] Inventors: Hermann Walter Gehlen, Kaiserslautern, Pfalz; Karl Hartmann, Bremerhaven; Gerhard Thieme, Kaiserslautern, Pfalz, all of Germany

[73] Assignee: Eisenwerke Kaiserslautern GmbH, Kaiserslautern/Pfalz, Germany

[22] Filed: July 16, 1970

[21] Appl. No.: 62,786

Related U.S. Application Data

[62] Division of Ser. No. 798,915, Feb. 13, 1969, Pat. No. 3,706,209.

[52] U.S. Cl. ................................. 62/62, 62/341
[51] Int. Cl. ............................. F25d 25/00
[58] Field of Search ..................... 62/341, 62

[56] References Cited
UNITED STATES PATENTS
3,686,889  8/1972  Harza ................................. 62/62

Primary Examiner—Meyer Perlin
Assistant Examiner—Ronald C. Capossela
Attorney—Greene & Durr

[57] ABSTRACT

Fillet blocks of fish and other meat are produced by deep-freezing the fresh fillets to be treated and compressing the same while in deep-frozen condition into blocks of predetermined weight and dimension. Apparatus for the carrying into effect the process comprises a deep-cooled compression chamber, a pressure and ejection piston mounted for displacement therein, and a closure piston acting as a closure valve for said chamber, to enable compression of a fillet portion placed in said chamber into a block in the closed position of said closure piston, as well as ejection of the block formed by said pressure piston in the open position of said closure piston, respectively. A third feeding piston serves to introduce the pre-frozen fillets into the chamber in the open position of the closure piston.

1 Claim, 1 Drawing Figure

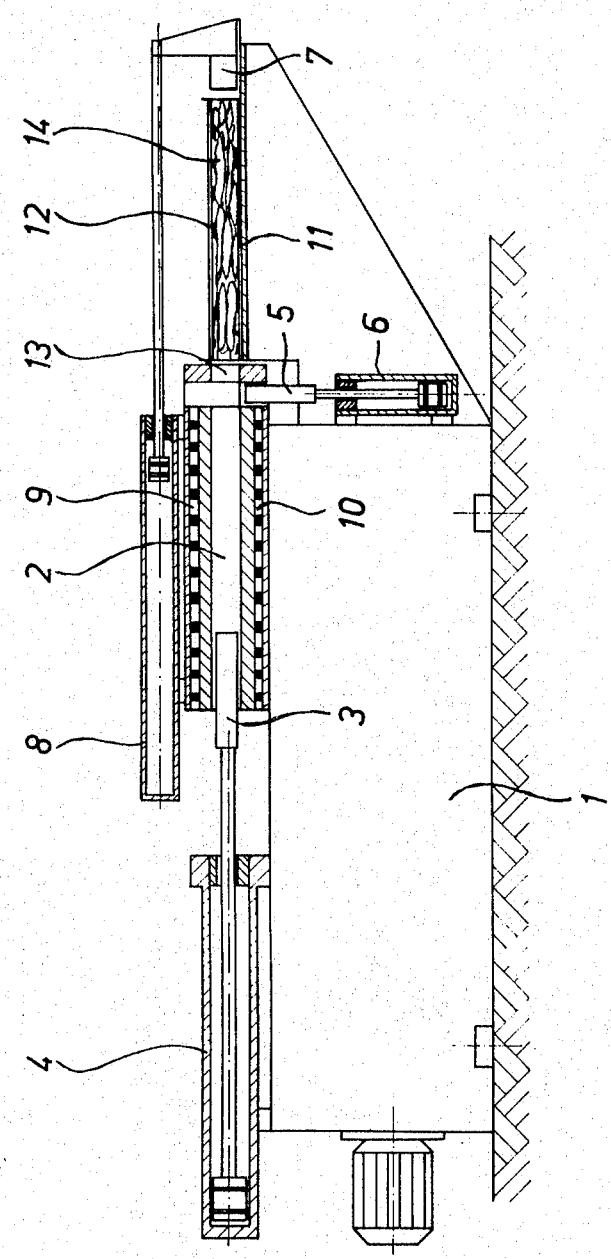

METHOD OF PRODUCING DEEP-FROZEN FILLET BLOCKS

This application is a division of application Ser. No. 798,915; filed Feb. 13, 1969 now U.S. Pat. No. 3,706,209; entitled METHOD OF AND MEANS FOR PRODUCING DEEP-FROZEN FILLET BLOCKS.

The present invention relates to a method of an apparatus for producing deep-frozen fillet blocks, preferably in slab or slice form, that is, blocks of lean meat, in particular cleaned and filleted fish meat or the meat of vertebrates (beef, veal, mutton, etc.), or of any equivalent edible material.

There are many known methods and devices for the processing of meat into blocks. Thus, it is known to compress portions of fresh fish or other meat into blocks in a mold with the aid of a two-piston press under a pressure of approximately 0.5 atm. and afterwards, or simultaneously, to deep-freeze the blocks in said mold.

According to another known method, a platform or conveyor belt having mounted thereon boxes or molds containing portions of fresh fish or the like meat, passes under a roller press, whereby the portions of meat are pressed into the molds with slight pressure and the resultant slightly compressed blocks are subsequently deep frozen.

It is also known to compress pieces of fresh fish meat in an unfrozen and wet condition into block form and then to return the juices squeezed out during the compression process back to the blocks by injection, whereupon the resultant fillet blocks or packs are then frozen.

Finally, it is known to grind fish or other meat in a worm mill or press, then to freeze the composition in the encased mouthpiece of the mill and, on ejection therefrom, to cut portions from the issuing endless length of frozen ground meat.

It will be appreciated that there is a common factor in all these known methods in that the meat of fish or the like is compressed in a wet and unfrozen condition, a feature which, with the exception of the treatment effected in a worm mill, as in the last example, leads to considerable deformation and comminution of the muscle fibre texture of the meat being treated or processed. Therefore, in its subsequent final condition of use, the products obtained scarcely have any resemblance to the usual appearance of meat, be it fish or any of the other meats mentioned. The loss of fluid or juices from the tissues, resulting from the compression in the wet or substantially unfrozen condition of the meat, is even more unpleasantly apparent in the known processes, wherefor in one of the processes mentioned the juices are subsequently reinjected. Apart from its complicated nature, this re-injection method is not suitable for retaining the muscle fibre texture and the natural distribution of solid and liquid components of the fish or meat.

In general, therefore, in the known methods the portions of the meat, such as fish meat, are deposited into containers in a pressureless or almost pressureless and fresh condition and are only then deep frozen. A block prepared in this manner has no uniform thickness and its texture and in turn its specific weight are not homogeneous. Again, if such methods are used on board ship, the available storage capacity of the ship is not used to the best possible advantage. Since the blocks in the form of slices, slabs, or the like are finally cut up into fillet packs of normal commercial dimensions, further disadvantages result from the different weight proportions or specific weight of the individual parts of the slabs. Attempts have hitherto been made to overcome this difficulty by weighing the fillets before they are deep frozen. This, however, involves a great deal of lost time and is practically impossible or at least impracticable in conjunction with processing operations on board ship.

Accordingly, an important object of the prsent invention is to overcome the foregoing and related difficulties, more particularly, to enable meat, especially though not limitatively, fish meat, to be processed and converted into deep-frozen fillet blocks, while substantially retaining the texture of the meat in its fresh condition and, at the same time, to ensure that the blocks are of uniform specific weight throughout, in such a manner as to result in final homogeneous fillet packs cut therefrom of constant predetermined dimension and weight, suitable for use in conjunction with mass distribution and marketing operations.

A more specific object of the invention is the provision of meat fillet packs which substantially retain the liquid or juices in their original distribution in the final fillet packs or products.

With the foregoing objects in view, the method of preparing fillet blocks or in general blocks of edible material according to the present invention involves generally the step of treating portions of meat or fillets by feeding the same to a cooled compression chamber in a deep-frozen condition and subsequently compressing the same in said chamber into slab, slice or other block form.

Thus, by the present invention it has unexpectedly been found that deep-frozen fillets can be immediately compressed into blocks in suitably formed compression chambers and with the action of a suitably high pressure, without the previously occurring destruction of the muscle fibre tissue and, in particular, without the previous dehydration of the meat and resultant reduced quality of the meat.

Furthermore, with the invention a homogeneous, stable block of comparatively high specific weight is formed. The specific weight of all the blocks produced is the same, whereby the blocks or slabs can be cut into portions of fillet or sizes in the normal manner of exactly identical weight and dimension.

The apparatus for carrying into effect the method according to the invention comprises a press having a deep-cooled compression chamber and a pressure and ejection piston adapted for displacement therein under the control of a hydraulic pressure cylinder, a closure piston operating as a closure valve for said chamber under the control of a hydraulic closure cylinder, and a feeding piston under the control of a hydraulic feeding cylinder.

Since the apparatus is normally operated on relatively warm premises, the compression chamber is deep-cooled before use. During operation, the cooling output may be reduced in that it has only to ensure that the deep-cooled fillets remain in deep-cooled condition even when subjected to pressure during treatment or processing.

Further features and objects of the invention, as well as novel aspects thereof, will become more apparent from the following detailed description, taken in conjunction with the accompanying FIGURE forming part of this specification and showing diagrammatically a preferred device for the carrying into effect of the invention.

In the embodiment illustrated and designed for hydraulic operation, a compression chamber 2 is mounted on a frame 1 which supports the hydraulic control mechanism (not shown) for a three-piston press cooperating with the chamber 2. The three-piston press includes a compression and ejection piston 3 displaceable within the chamber 2 under the control of a hydraulic cylinder 4, a closure piston or valve 5 operable by a hydraulic cylinder 6, and a feeding piston 7 actuatable by a hydraulic cylinder 8. In the embodiment shown, the compression chamber 2 is horizontally mounted on the frame 1, but it will be appreciated that any other arrangement of the pressure chamber and of the three pistons of the press is possible.

The compression chamber 2 is cooled by means of refrigerating devices 9 and 10 which are respectively provided above and below the chamber and by means of which the pressure chamber is undercooled each time it is prepared for use. When the device is in operation, it is only necessary to cool the chamber to an extent to ensure that the inserted deep-cooled fish or the like fillets remain in the deep-cooled condition even under the action of the pressure exerted thereon during compression.

In the embodiment illustrated, a platform 11 is provided at one end of the horizontal pressure chamber 2 and adapted to receive one or more casettes or the like meat holders 12 which are displaceable transversely to the axis of symmetry of the chamber 2 so as to be brought into, and removed from, a position of registration or alignment with the opening 13 of the chamber 2 controlled by the piston 5. The holders 12 are adapted to first receive loose unpressed or only slightly compressed deep-frozen fillets for transfer into the pressure chamber 2 and then, after compression in and ejection of the fillets from said chamber, to receive the formed fillet blocks and to convey the same away from the apparatus. As an alternative, the platform 11 may be replaced by a conveyor belt or the like, to permit the phased supply and removal of the casettes or holders of frozen and compressed fillet blocks, respectively.

Prior to the commencement of the operation, the pressure piston 3 is in its starting position, that is, at the left-hand end of the chamber 2, as shown in the drawing. The closure piston 5 is in its lower position, leaving the feeding and ejection aperture 13 of the chamber 2 unimpeded. The feeding piston 7 is in its right-hand position in the starting postion of the device shown by the drawing.

In operation, the feeding piston 7 is at first operated by an appropriate control of the hydraulic cylinder 8, to push the deep-frozen fillet 14 in the holder 12 through the opening 13 and into the chamber 2, whereupon the feeding piston 7 is returned to its starting position shown. The closure piston 5 is then raised to seal the chamber 2 and the pressure piston 3 is displaced to the right, to compress the contents of the chamber 2 into a compact homogeneous block. The closure piston 5 is then drawn downwardly and the resultant block expelled or ejected by the piston 3 through the opening 13 of the chamber and into the empty holder or casette 12. The latter is then removed or exchanged and another casette containing uncompressed deep-frozen meat or fillet is brought into alignment with the opening 13 in the chamber 2. Simultaneously, the pressure piston 3 returns to its starting position shown, placing thereby the device in position for the commencement of the next following pressing operation or cycle.

The method according to the present invention, carried into effect by apparatus as shown or equivalent thereto, ensures a continuous formation of deep-frozen fillet blocks or the like of the same specific weight throughout, substantially without destruction of the muscle fiber texture and, particularly, without the harmful or quality-reducing dehydration of the treated fish or other meat. Thus, for the first time, it is possible to provide fillet blocks of perfect quality which can be divided in a simple manner into portions of equal weight and size for packing.

In the foregoing the invention has been described in reference to a specific exemplary device and method. It will be evident, however, that variations and modifications, as well as the substitution of equivalent steps and elements may be made for those shown herein for illustration, may be made without departing from the broader scope and spirit of the invention. The specification and drawing are accordingly to be regarded in an illustrative rather than in a restrictive sense.

We claim:

1. A method of preparing fillet blocks of fish comprising the steps of deep-freezing fresh fillets to be treated at a temperature of −18°C and below and compressing the same while in deep-frozen condition into blocks of predetermined specific weight and dimensions, whereby said blocks retain the original juices and the muscle fibre structure of the fish.

* * * * *